Feb. 17, 1925.

A. M. KIRKPATRICK ET AL 1,527,141

CAKE TRAY AND COOLER

Filed Oct. 4, 1923

WITNESSES

INVENTORS
Anna M. Kirkpatrick
George R. Kirkpatrick
BY

ATTORNEYS

Patented Feb. 17, 1925.

1,527,141

UNITED STATES PATENT OFFICE.

ANNA M. KIRKPATRICK, OF WEST LAFAYETTE, OHIO, AND GEORGE ROSS KIRKPATRICK, OF NEW YORK, N. Y.

CAKE TRAY AND COOLER.

Application filed October 4, 1923. Serial No. 666,560.

*To all whom it may concern:*

Be it known that we, ANNA M. KIRKPATRICK and GEORGE R. KIRKPATRICK, citizens of the United States of America, and residents, respectively, of West Lafayette, in the county of Coshocton and State of Ohio, and the city of New York, borough of Manhattan, in the county and State of New York, have invented a new and Improved Cake Tray and Cooler, of which the following is a description.

Our invention relates to a device on which a cake may be placed after baking and the general object of the invention is to provide a cake tray that will be efficient for the cooling of the cake and efficient also for the storing, carrying, or serving of a cake and well adapted for receiving a pie instead of a cake.

The invention furthermore has for an object to provide a device of the indicated class which can be readily and economically manufactured with the minimum number of operations and which will embody the necessary strength and thus not be liable to become deformed even by long continued use.

An important object also of our invention is to provide on the holder handholds so formed and disposed as to promote convenience in handling the device as well as materially contributing toward the circulation of air beneath the holder for the rapid cooling of the cake or pie.

The nature of our invention and its distinguishing features and advantages will more clearly appear as the discription proceeds.

Reference is to be had to the accompanying drawings forming a part of this specification, it being understood that the drawings are merely illustrative of one example of the invention.

Figure 1:
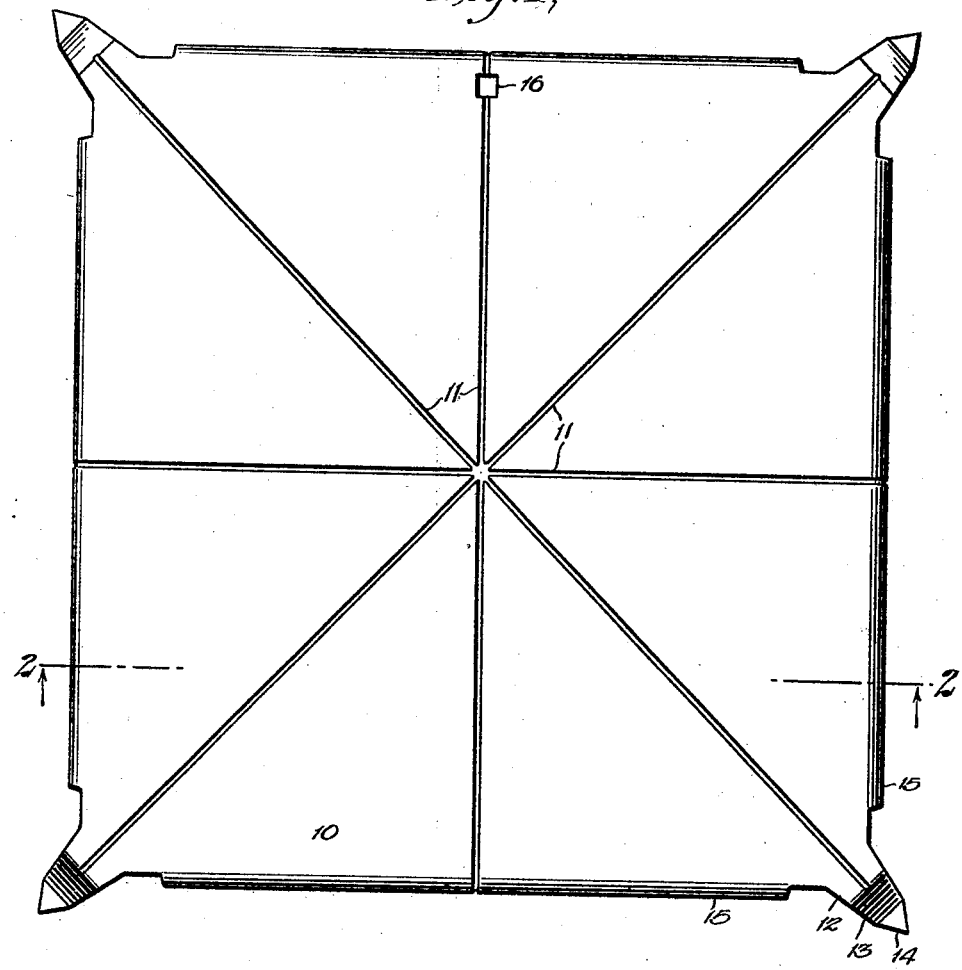
Figure 1 is a plan view of a combined cake tray and cooler embodying our invention.
Figure 2:
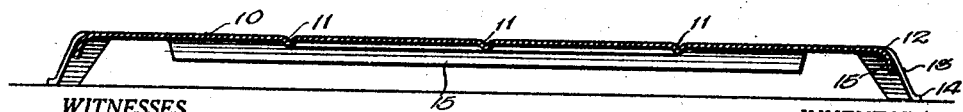
Figure 2 is a vertical section in the plane indicated by the line 2—2, Figure 1.

In carrying out our invention in accordance with the illustrated example the holder is formed from sheet metal and given the form of an approximately rectangular plate designated generally by the numeral 10. The plate is formed with four grooves 11, two of the grooves at right angles and bisecting the respective sides of the plate and the other two extending between the corners.

On the plate at each corner a member 12 is directed outwardly in the plane of the plate and integral therewith and then formed into an oblique leg 13, the lower end 14 of which is directed outwardly to constitute a foot.

At each side of the plate is formed an edge member 15 integral therewith and directed downwardly from the plane of the plate, said members merging on rounded lines into the body of the plate. The members 15 constitute handholds and in order that they may be efficient as such they terminate above the lower ends of the legs 13.

The grooves 11 provide for accurately cutting a cake into four equal parts or the cutting of a pie into triangular pieces. Subdivisions of the cake or pie may be readily made between adjacent lines 11, approximate accuracy in cutting being quite possible in view of the grooves 11.

The handhold members 15 enable a person to handle the device with convenience and in addition serve to stiffen the plate. Moreover, the members 15 being sustained materially above the lower ends of the legs 13, there is an ample circulation of air beneath the plate to promote the cooling thereof.

The form of the described device permits of a compact nesting of a plurality of the devices in storing or shipping. In practice a hole 16 is formed near one side edge to receive a nail or the like for hanging the device on a wall or door.

We would state in conclusion that while the illustrated example constitutes a practical embodiment of our invention, we do not limit ourselves strictly to the exact details herein illustrated, since, manifestly, the same can be considerably varied without departure from the spirit of the invention as defined in the appended claim.

Having thus described our invention, we claim:

As a new article of manufacture, a device of the class described comprising a rectangular plate adapted to hold a cake or pie, said plate having grooves in its upper surface at right angles to each other and bisecting the sides of the plate and extending to the extreme side edges thereof, said plate aside from said grooves presenting a top surface in a single plane and extending to the extreme side edges, said edges lying in said plane.

Mrs. ANNA M. KIRKPATRICK.
GEORGE ROSS KIRKPATRICK.